Nov. 6, 1956     C. W. CHENEY     2,769,471

HAND TOOLS FOR OPERATING WORM GEARED BAND CLIPS

Filed March 9, 1953

INVENTOR
CHARLES WILLIAM CHENEY

BY
Richardson, David and Nordon his ATTORNEYS

United States Patent Office 2,769,471
Patented Nov. 6, 1956

2,769,471

HAND TOOLS FOR OPERATING WORM GEARED BAND CLIPS

Charles William Cheney, Hockley, Birmingham, England

Application March 9, 1953, Serial No. 341,003

Claims priority, application Great Britain March 15, 1952

1 Claim. (Cl. 145—50)

This invention relates to a hand tool for use in operating a worm geared band clip of which the worm head is provided, as is normal, with a cross groove to be engaged by a tooth or bit of a screw driver. These band clips are widely used in industry and especially in aircraft construction for which a high standard of torque stress is laid down. In aeronautical work, instances occur where a band clip has to be secured to a pipe or tube which is in an inaccessible position whereat a standard screw-driver either cannot easily be employed or, if so employed, there is a risk that worm may not be tightened to a sufficient degree as to avoid unnecessary risk of insecurity of the band clip.

According to the present invention, a hand tool for use in operating a worm geared band clip is characterised by a sheath adapted to fit over said worm head and provided within it with tooth to engage said groove said sheath containing a resilient clutch element capable of snap engaging an annular groove in said head and of detachably holding the tool thereto.

According to an embodiment of the invention a sheath is constructed as a key driver with a wing nut for applying the sheath and operating it, the sheath being applied to the worm head by a sliding snap engagement and removed in a similar manner. Alternatively, the sheath is provided with an extension rod capable of being used like an ordinary screw driver. In the engaged position of the sheath it can be turned in either direction either by the wing nut or the screw driver without risk of accidental disengagement of the tooth with the groove and it is found to be an advantage when tightening and releasing band clips when used on pipes or tubes located in inaccessible positions where the ordinary type of screw driver is found either to be unusable or difficult to use.

The accompanying drawing illustrates the invention by way of example and in a desirable form.

(Figs. 1 and 2.)

Figures 1, 3:
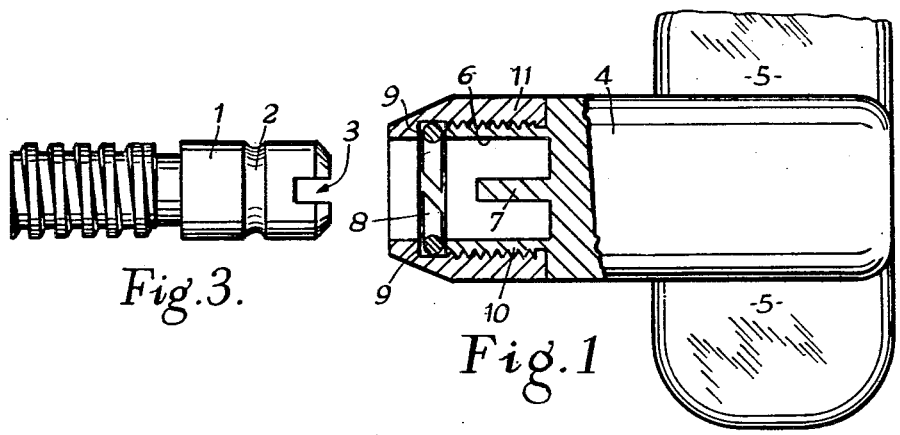
Fig. 1 is a longitudinal sectional elevation of a hand tool according to the invention.
Fig. 3 is an elevation of a worm adapted to be engaged by the hand tool.
Figures 2, 4:
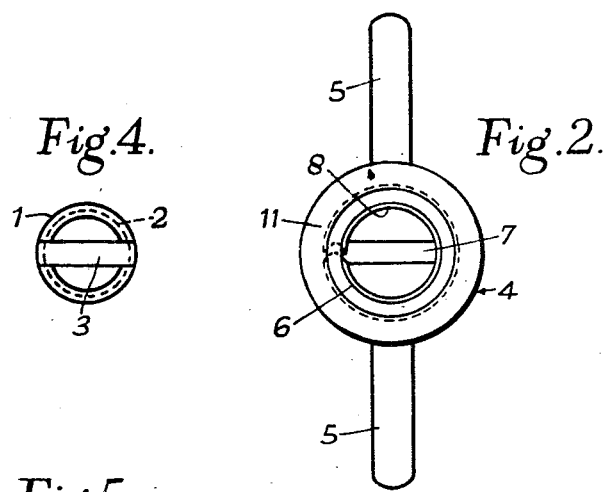
Fig. 2 is an end view of Fig. 1.
Fig. 4 is an end view of Fig. 3.

In the drawing, a cylindrical worm 1 of extended length has an exterior annular groove or shallow circular recess 2 inwardly of the cross groove 3 in the head end of said worm. A tool for operating the worm and for carrying a band clip comprises a relatively short length key 4 having side wings 5 to be gripped by the fingers of the user, a bore 6 to accommodate an axial tooth 7, adapted to engage the cross groove 3 and also to accommodate a spring band 8 disposed between an end of the shank of the key and an inner circular shoulder 9 at the open front end of the tool. The tooth 7 is located inwardly of the band 8 and the latter is held in operative position by an end of a screwed shank 10 threading into a tapped nozzle 11 of the key 4.

In use the key or driver is first pushed onto the cylindrical head 1 of the worm until the tooth 7 engages the cross groove 3, when automatically the spring band 8 will effectively snap engage the circular recess or groove 2. Therefore the worm and the key become one-piece for handling to apply a band clip 12 for attaching it and removing it, the key being detachable from the clip as and when required.

Figure 5:
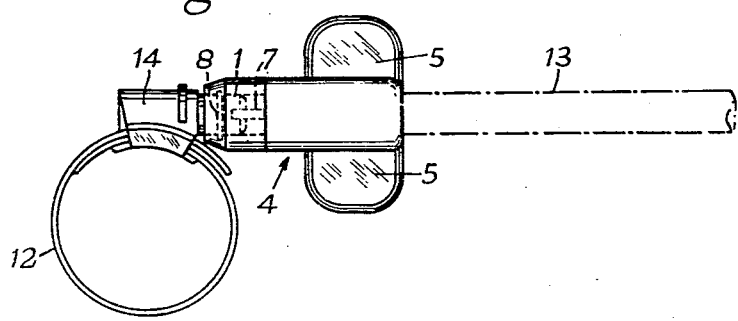
Fig. 5 shows the hand tool (Figs. 1 and 2) in the engaged position on the worm head of a band clip, the two parts engaged by a push-on resilient coupling operating between the hand tool and the worm head.

Fig. 5 shows such an engagement between the clip 12 and the key; an extension rod 13 as an alternative to the wings 5 being indicated in dotted lines so as to form an ordinary screw driver tool. The clip 12 in Fig. 5 is in closed condition, but would be in open condition for its application. The worm is located as is usual in a housing 14, otherwise the connection between the worm 1 and the key, or screw driver, is as described with reference to Figs. 1–4.

It will be appreciated that the hand tool for operating the band clip can have a snap-on snap-off engagement and disengagement with the head of the worm by providing a resilient clutch element in the sheath for snap engaging the annular groove in the head. This is most advantageous where a band clip is located in an inaccessible position where the tip of the ordinary screw driver is found difficult to use due to the inability of the fitter to maintain its engagement.

I claim:

A screw-driver, for coacting with the cylindrical head of a worm screw having an annular recess in the periphery of said head, comprising a body having fingers gripping wings at one end thereof, an externally threaded shank at the other end of said body, a cylindrical socket in said shank, a tooth rigid with said body and extending centrally into the rear part of said socket, an internally threaded nozzle engaging said threaded shank and having a shoulder located in the rear of the forward end part of said nozzle, and a split expansible ring arranged coaxially in said nozzle and located between said shoulder and the forward end of said threaded shank, said ring being arranged in advance of the said tooth.

References Cited in the file of this patent

UNITED STATES PATENTS

| | | |
|---|---|---|
| 1,188,305 | Noerteman | June 20, 1916 |
| 1,256,139 | Kietlinski | Feb. 12, 1918 |
| 1,774,347 | Bainton | Aug. 26, 1930 |
| 1,867,296 | Woodruff | July 12, 1932 |
| 1,886,155 | Bohlman | Nov. 1, 1932 |
| 2,476,617 | Mueller | July 19, 1949 |
| 2,522,217 | Fischer et al. | Sept. 12, 1950 |

FOREIGN PATENTS

| | | |
|---|---|---|
| 34,047 | Norway | July 31, 1922 |
| 399,094 | Great Britain | Sept. 28, 1933 |